(12) United States Patent
Maffeis

(10) Patent No.: US 6,431,536 B1
(45) Date of Patent: Aug. 13, 2002

(54) ADJUSTABLE GUIDE SYSTEM FOR JAWS OF FLUID-OPERATED GRIPPERS

(75) Inventor: Giuseppe Maffeis, Roncadelle (IT)

(73) Assignee: Gimatic S.p.A. (IT)

( * ) Notice: Subject to any disclaimer, the term of this patent is extended or adjusted under 35 U.S.C. 154(b) by 0 days.

(21) Appl. No.: 09/886,438

(22) Filed: Jun. 21, 2001

(30) Foreign Application Priority Data

Oct. 10, 2000 (IT) .......................................... BS200077 U

(51) Int. Cl.⁷ ................................................. B25B 1/02
(52) U.S. Cl. ........................ 269/203; 269/251; 269/233; 269/215
(58) Field of Search ................................ 269/203, 215, 269/213, 246, 309, 251, 233

(56) References Cited

U.S. PATENT DOCUMENTS

| | | | | |
|---|---|---|---|---|
| 4,191,367 A | * | 3/1980 | Speiser et al. | 269/203 |
| 6,206,354 B1 | * | 3/2001 | Lin | 269/43 |
| 6,250,620 B1 | * | 6/2001 | Durfee, Jr. | 269/43 |

* cited by examiner

Primary Examiner—Joseph J. Hail, III
Assistant Examiner—Lee Wilson
(74) Attorney, Agent, or Firm—McGlew and Tuttle, P.C.

(57) ABSTRACT

A gripper is provided with a body with a top part having at least one pair of parallel wings delimiting between them a channel for guiding at least two jaws. At least one wing (14) on one side of the channel is interrupted in the center (22), elasticized and provided with a bolt for the guiding and the adjusting of the coupling clearances of each jaw independently of one another.

10 Claims, 2 Drawing Sheets

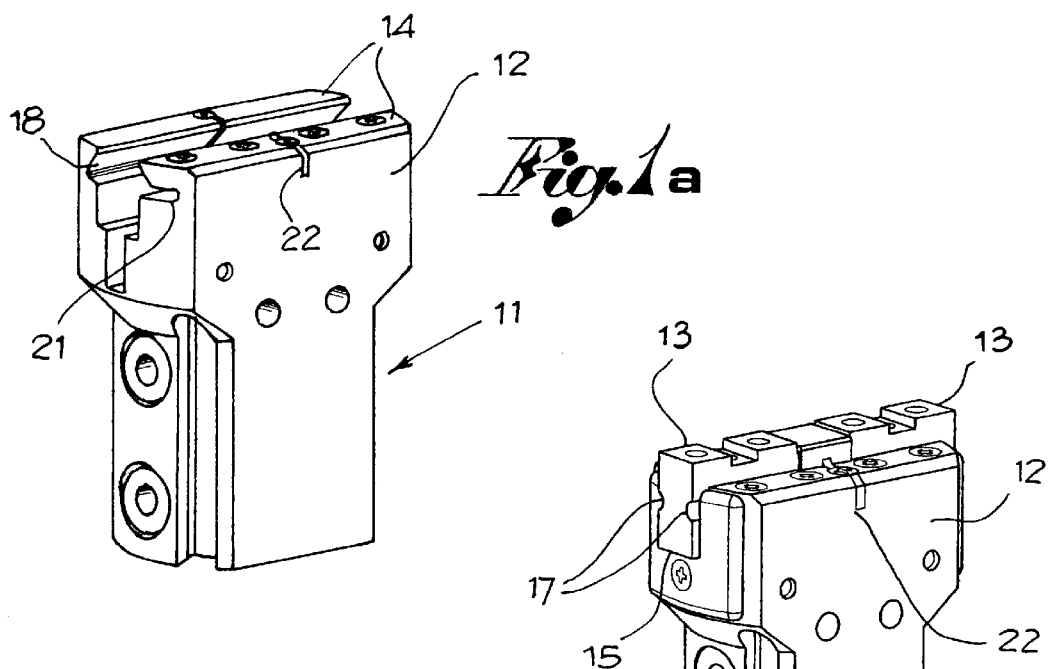
Fig.1a
Fig.1
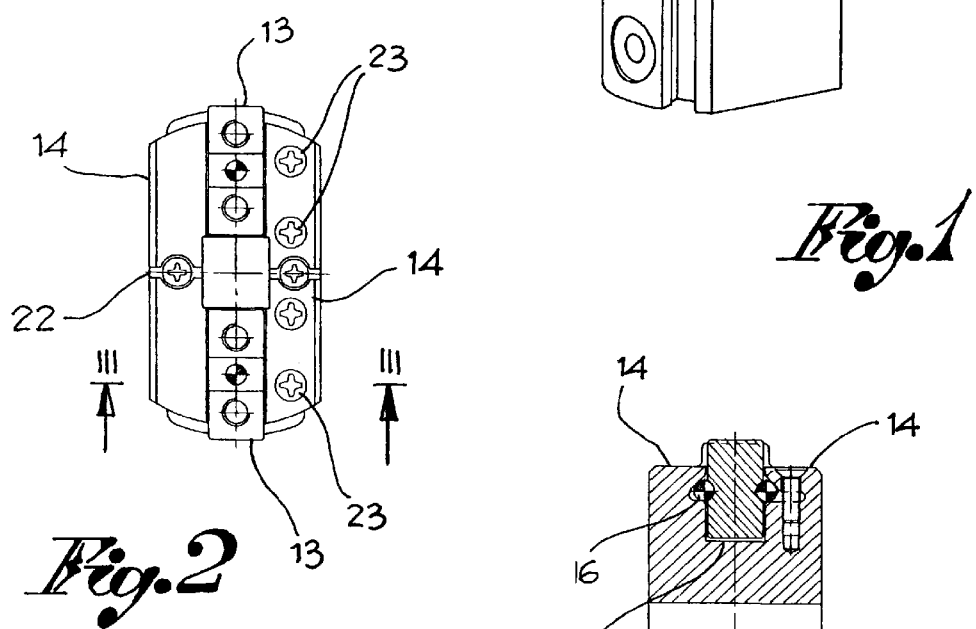
Fig.2
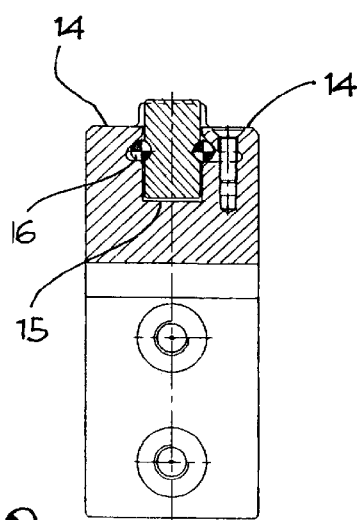
Fig.3

ADJUSTABLE GUIDE SYSTEM FOR JAWS OF FLUID-OPERATED GRIPPERS

FIELD OF THE INVENTION

The present invention pertains to the field of fluid-operated grippers of the type comprising a body and at least two jaws that can move linearly on said body in opposite directions for an action of pressing and releasing a piece, and it specifically pertains to a system for guiding such jaws.

BACKGROUND OF THE INVENTION

A system for guiding the jaws in said two-jaw grippers, comprising at least one cylindrical bolt arranged in semicylindrical, facing slots provided in one side of the jaws and in one part of the body of the gripper that are adjacent to the side of the jaws, is already known from a previous patent application of the same applicant. In this system, adjusting screws, which transversely connect the parts of the body that delimit the guide for the jaws, are provided for adjusting possible clearances between the jaws and the body of the gripper.

However, the jaws of a same gripper may also have different work tolerances and assembly clearances, and thus, they would require an adjustment independent of one another for their correct positioning. However, this adjustment is not possible since either the guide in which the jaws slide or the cylindrical bolts are continuous in their length.

SUMMARY AND OBJECTS OF THE INVENTION

On the contrary, the object of the present invention is to provide a gripper, in which the jaws can be adjusted independently and separately for their correct positioning even if they have different work tolerances and/or coupling clearances.

According to the present invention a gripper is provided with a body with a top part having at least a pair of parallel wings delimiting between them a channel, and at least two jaws that can move linearly in the channel in opposite directions and are controlled by an actuator for their action of pressing and releasing a piece. Each jaw is supported and guided in the channel with the interposition of at least one cylindrical guiding bolt arranged in the facing slots provided on one side of the jaw and on the wing portion adjacent to same. A two-jaw gripper has at least one wing on one side of the channel for guiding the jaws which is interrupted in the center to define two wing segments. Each wing segment corresponds to one jaw, in that in the slot of each of the wing segments there is provided a bolt for guiding a jaw separated from a bolt for guiding the other jaw. Each wing segment has its elasticized, and relatively flexible part, which is engaged by at least one adjusting screw for adjusting the tightening and coupling clearances between one bolt and the respective jaw independently of the other bolt with the respective jaw.

Greater details of the present invention will become more evident from the description given below with reference to the attached, indicative and nonlimiting drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a perspective view of a two-jaw gripper according to the present invention;

FIG. 1a is a perspective view of only the body of the jaw of FIG. 1;

FIG. 2 is a top view of the gripper;

FIG. 3 is a partial sectional view of the gripper according to the line III–III in FIG. 2;

DESCRIPTION OF THE PREFERRED EMBODIMENT

Figure 4:
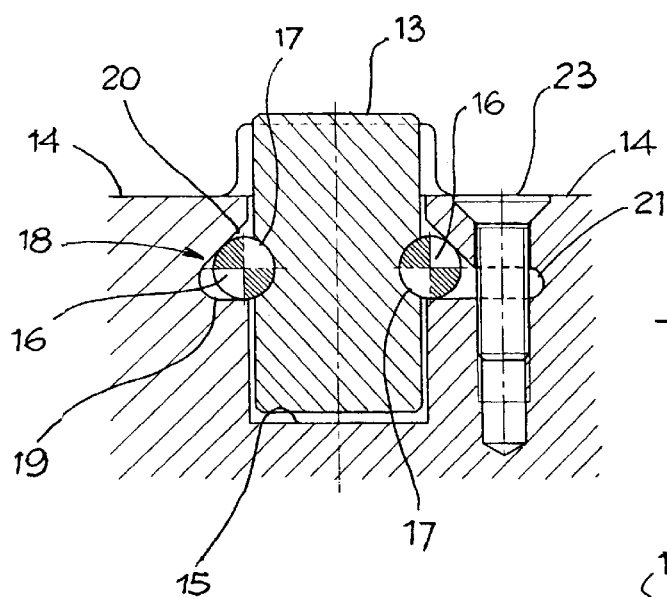
FIG. 4 is an enlarged view of the section of FIG. 3.

Referring to the drawings in particular, the gripper illustrated in FIGS. 1–4 essentially comprises a body 11 with a top part 12, two pressing jaws 13 and a fluid-type piston (not shown).

The top part 12 of the body 11 has, in cross section, an essentially U shape with two parallel wings 14 that delimit between them a guide channel 15, into which the two jaws 13 are inserted and can move linearly in opposite directions to one another.

In its linear movements, each jaw 13 is guided in the channel 15 on at least one cylindrical bolt 16 arranged between one side of the jaw proper and the top wing 14 adjacent to same.

In particular, two bolts 16 are provided in the drawings, and each bolt is arranged between a semicylindrical slot 17 provided on one side of the jaw 13 and a facing, wedge-shaped slot 18 provided on the internal face of the wing 14. In practice, the slot 18 has a surface for supporting the bolt 16 in its lower part, and, in the upper part, an inclined wall 20 against which the bolt rests.

On the bottom of one of the slots 18 is provided a longitudinal elasticizing groove 21, which extends towards the outside of the respective wing 14 parallel to the upper face of same.

The wing 14 carrying the slot 18 with the bottom groove 21 is interrupted and is divided into two segments by an intermediate vertical space 22, which extends in depth at least to the level of the groove 21. Also, the bolt 16 in the slot 18 is made of two parts, each corresponding to one segment of the wing 14, and each wing segment and bolt segment corresponds to a respective jaw. Moreover, each wing segment is provided with at least one, or preferably two, adjusting screws 23, which pass through the elasticizing groove 21, connecting the two upper and lower parts of the wing separated by the groove 21. Therefore, with these screws, it is possible to adjust the pressure of the inclined wall 20 of the slot 18 on the corresponding bolt 16 as desired and thus to recover any clearances of the respective jaw. Thanks to the vertical space 22 which interrupts the wing 14 provided with the elasticizing groove, the two jaws are adjusted separately and independently in terms of the opposite bolt or the opposite side of the guide channel 15 acting as a fixed tappet.

Figure 5:
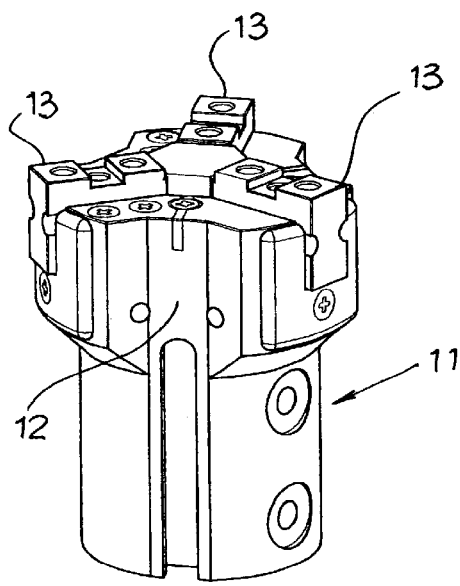
FIG. 5 is a perspective view of a three-jaw gripper.
Figure 6:
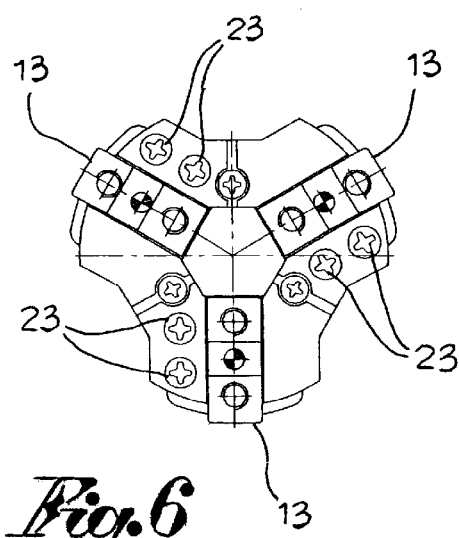
FIG. 6 is a top view of the gripper of FIG. 5.
Figure 7:
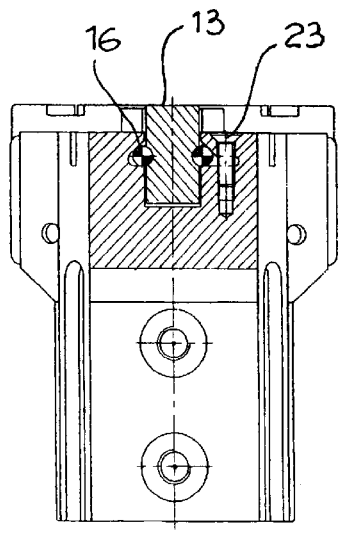
FIG. 7 is a partial sectional view of the gripper of FIGS. 5 and 6 at the level of an adjusting screw.

The same adjustment system can be applied to grippers with more than two jaws, e.g., to the gripper with three jaws illustrated in FIGS. 5–7. In this case, the guide channels 15 and the bolts 16 are already separate and independent for the same structure of the gripper, and therefore the elasticizing groove 21 of the wing at the level of the respective bolt 16 is sufficient.

Finally, it should be noted that the slots 18 of the wings 14 are shaped to maintain the bolts 16 always on the lower resting level and not to create a component for the downward pushing of the jaw.

While specific embodiments of the invention have been shown and described in detail to illustrate the application of the principles of the invention, it will be understood that the invention may be embodied otherwise without departing from such principles.

What is claimed is:

1. A gripper comprising:
   a body with a top part having a first wing and a second wing, said first wing being interrurpted at an intermediate location and defining a first wing segment and a second wing segment, said first wing segment and said second wing delimiting a channel therebetween;
   a first jaw movable linearly in said channel and controlled by an actuator for pressing and releasing a piece and a second jaw, a first slot provided on one side of said first jaw and on said first wing segment adjacent to said first jaw and a second slot provided on one side of said second jaw;
   a first cylindrical guiding bolt arranged in said first slot, said first jaw being supported and guided in said channel with the interposition of said first cylindrical guiding bolt,
   a second cylindrical guiding bolt arranged in said second slot, said second jaw being supported and guided with said second cylindrical guiding bolt, said first wing segment having an elasticized flexible part;
   an adjusting screw engaging said elasticized flexible part of said first wing segment for adjusting the tightening coupling clearances between said first bolt and said first jaw independently of the second bolt with the second jaw.

2. The gripper in accordance with claim 1, wherein said elasticized flexible part has an elasticizing groove for the bending of an upper part of said first wing segment, said adjusting screw being arranged at right angles to said elasticizing groove.

3. The gripper in accordance with the claim 1, wherein the jaws are each guided, on one side, on a continuous bolt along a wing of the guide channel, and on an opposite side, each along a bolt arranged along the respective wing segment with adjustable tightening.

4. The gripper in accordance with the claim 1, further comprising:
   a third wing having an interruption forming a third wing first wing segment in parallel to said second wing segment to form a second channel and forming a third wing second wing segment in parallel to a wing segment of said second wing to form a third channel;
   a third jaw in said third channel, said second jaw being in said second channel;
   a third cylindrical guiding bolt, a third slot provided on one side of said third jaw and on said third wing second wing segment adjacent to a side of said third jaw; and
   a third adjusting screw engaging an elasticized flexible part of said third wing for adjusting the tightening and coupling clearances between said third bolt and said third jaw independently of the other bolts and jaws.

5. The gripper in accordance with claim 1, wherein each slot of each jaw is semicylindrical, and each slot provided on each wing segment is wedge-shaped having an inclined upper surface and a lower surface defining a rest position of the bolt.

6. A gripper comprising;
   a body with a top part having a first wing and a parallel second wing delimiting a channel therebetween, one of said wings on one side of the channel being interrupted at an intermediate location and defining a first wing segment and a second wing segment,
   a first jaw movable linearly in said channel;
   a second jaw movable linearly in said channel in an opposite direction to said first jaw, said jaws being controlled by an actuator for pressing and releasing a piece, a first slot provided on one side of said first jaw and on said first wing segment adjacent to said first jaw and a second slot provided on one side of said second jaw and on said second wing segment adjacent to said second jaw;
   a first cylindrical guiding bolt arranged in said first slot, said first jaw being supported and guided in the channel with the interposition of said first cylindrical guiding bolt;
   a second cylindrical guiding bolt arranged in said second slot, said second jaw being supported and guided with said second cylindrical guiding bolt, each wing segment having an elasticized flexible part;
   first adjusting screw engaging the elasticized flexible part of said first wing segment for adjusting the tightening and coupling clearances between said first bolt and said first jaw independently of said second bolt with said second jaw; and
   second adjusting screw engaging the elasticized flexible part of said second wing segment for adjusting the tightening and coupling clearances between said first bolt and said first jaw independently of said first bolt with said first jaw.

7. The gripper in accordance with claim 6, wherein each respective said elasticized flexible part has an elasticizing groove in which on the bottom of the slot of each wing segment containing the respective guide bolt is provided for the bending of an upper part of a respective said wing segment, each adjusting screw being respectively arranged at right angles to the respective elasticizing groove.

8. The gripper in accordance with the claim 7, wherein the jaws are each guided, on one side, on a continuous bolt along a wing of the guide channel, and on an opposite side, each along a bolt arranged along a respective wing segment with adjustable tightening, 9. A gripper comprising a body with a top part having a plurality of pairs of parallel wings for delimiting the guide channels for at least three jaws that can each move linearly in a channel, and in which each jaw is supported and is guided in the respective channel with the, interposition of at least one cylindrical bolt arranged in slots provided in the side of the jaw and on the internal face of the adjacent wing, an elasticizing groove being provided on the bottom of the slot of at least one wing of each channel for a bending of an upper part of the wing, and each wing is engaged by at least a respective adjusting screw for adjusting the tightening and recovering of coupling clearances between the bolt and the respective jaw.

10. The gripper in accordance with claim 9, wherein each said slot of each said jaw is semicylindrical, and each said slot provided on each said wing is wedge-shaped having an inclined upper surface and a lower surface defining a rest position of the bolt.

* * * * *